ically attached between an upper portion of the frame and a lower terminal sleeve member. The sleeve member is slidably mounted upon the length of the trailing arm and is selectively fastened to the trailing arm at various positions therealong whereby the depth of the soil engaging tools in the soil is determined. A compression spring is utilized to biasly extend the extensile arm arrangement, and the upper portion of the extensile arm has an over-center locking device whereby the extensile arm may be rapidly lengthened or shortened, and respectively locked in such condition, thereby respectively engaging or disengaging the soil engaging tools in the soil.

United States Patent [19]
Ankenman

[11] 4,193,456
[45] Mar. 18, 1980

[54] BIASED AGRICULTURAL IMPLEMENT

[76] Inventor: Dale E. Ankenman, Rte. 1, Almena, Kans. 67622

[21] Appl. No.: 897,030

[22] Filed: Apr. 17, 1978

[51] Int. Cl.² ............... A01B 37/00; A01B 35/24
[52] U.S. Cl. ............... 172/272; 172/676; 172/705; 172/463; 172/494
[58] Field of Search ............... 172/676, 707, 705, 708, 172/134, 300, 301, 302, 677, 265, 463, 266, 506, 267, 268, 303, 710, 749, 753, 494, 683, 668, 272

[56] References Cited

U.S. PATENT DOCUMENTS

| | | | |
|---|---|---|---|
| 1,332,643 | 3/1920 | Thomas | 172/676 |
| 1,760,336 | 9/1930 | Benjamin | 172/300 |
| 1,886,438 | 11/1932 | Weeks | 172/676 |
| 2,134,438 | 10/1938 | Click | 172/676 |
| 2,136,640 | 11/1938 | Smith | 172/303 X |
| 2,575,429 | 11/1951 | Rogers | 172/494 X |
| 2,675,752 | 4/1954 | Wangsgard | 172/676 |
| 2,865,117 | 12/1958 | Davis | 172/494 X |
| 3,098,529 | 7/1963 | Wade | 172/710 |
| 3,258,076 | 6/1966 | Groenke | 172/710 |
| 3,306,368 | 2/1967 | Rosenvold | 172/276 |
| 3,480,086 | 11/1969 | Groenke | 172/710 |
| 3,493,055 | 2/1970 | Van Peursem | 172/708 |

FOREIGN PATENT DOCUMENTS 87803 9/1959 Denmark .................. 172/710
179995 5/1922 United Kingdom ............ 172/676

OTHER PUBLICATIONS

Glencoe Chisel Plows "Adjusto-Pitch" Advertising Brochure GCP-371 of Dynamics Corp. of America, Glencoe, Minn. 9/72.

Primary Examiner—Richard J. Johnson
Attorney, Agent, or Firm—Fishburn, Gold & Litman

[57] ABSTRACT

Apparatus for connecting soil engaging tools to mobile agricultural equipment includes a vertically extending frame adapted for connection to the agricultural equipment and a trailing arm pivotally attached to the frame and having soil engaging tools attached rearwardly thereof. An extensile arm arrangement is pivot- 8 Claims, 7 Drawing Figures

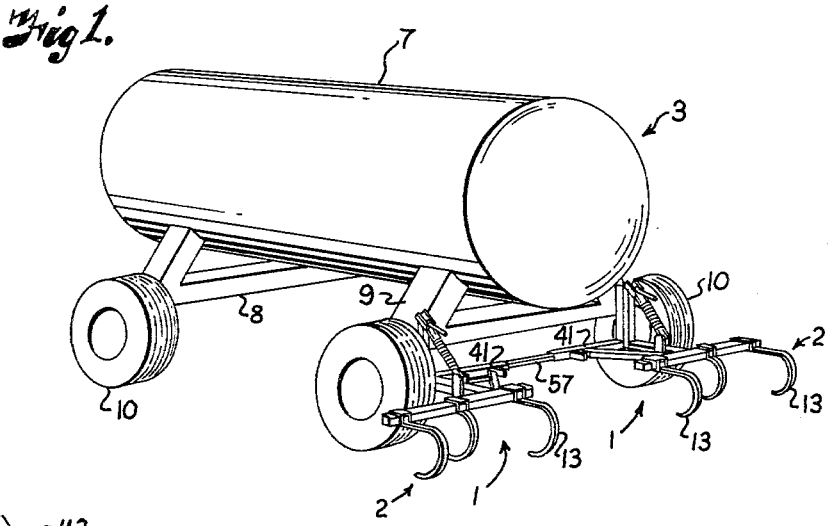
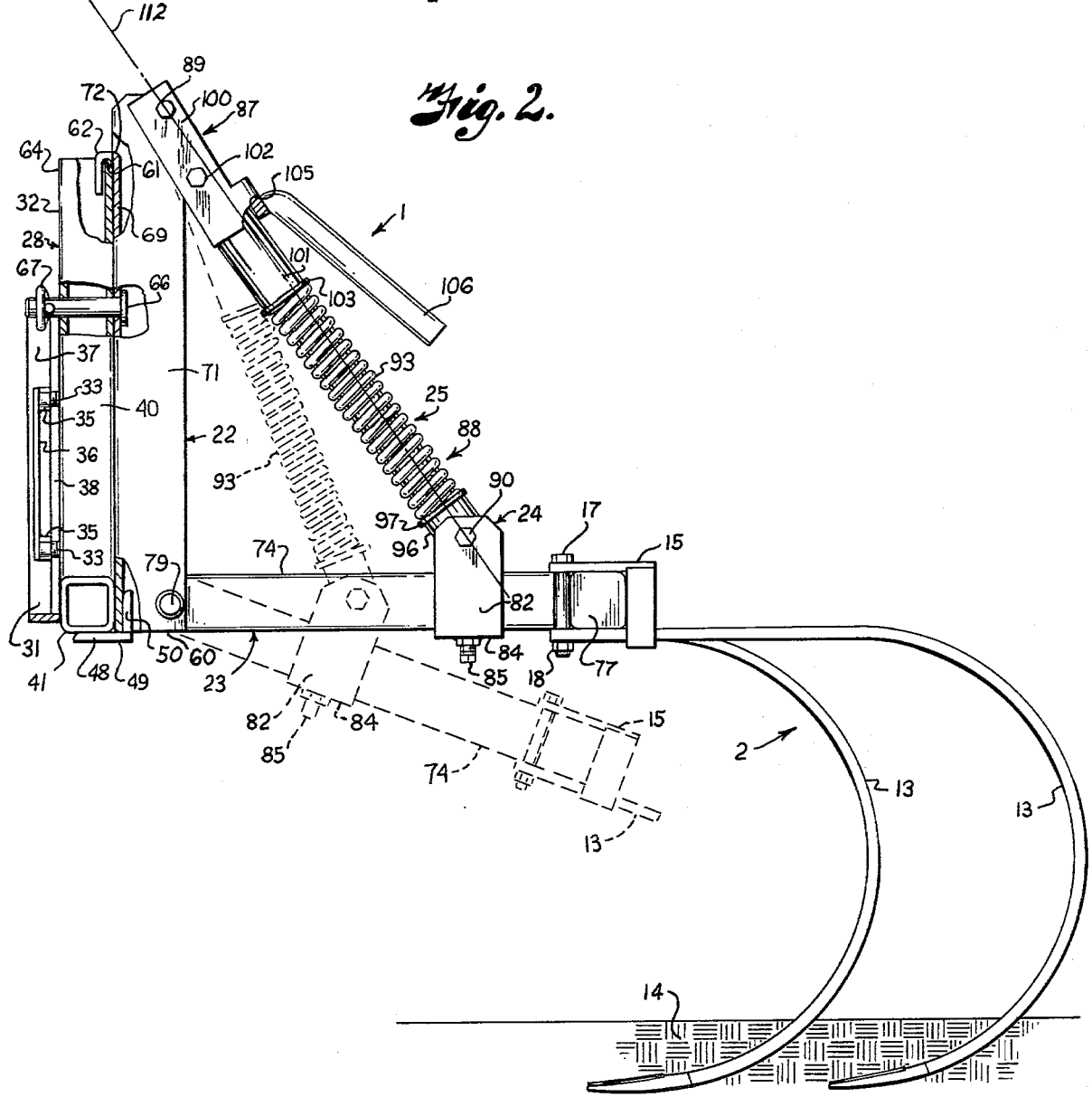

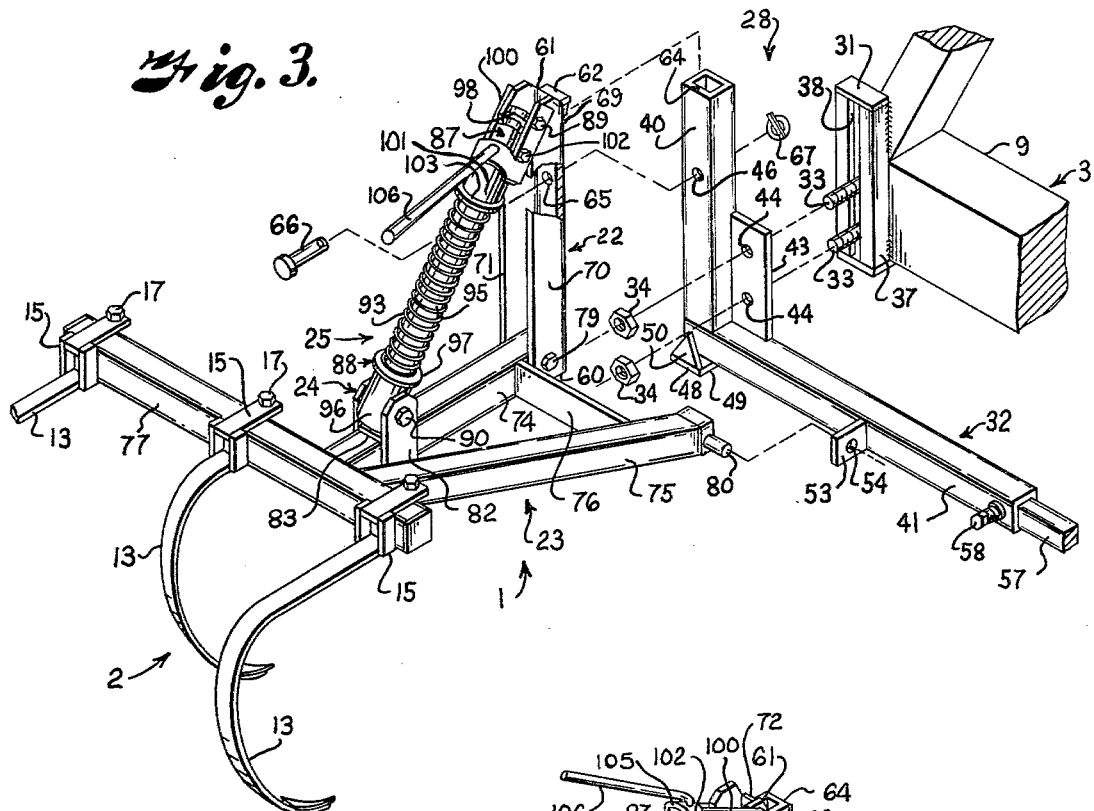
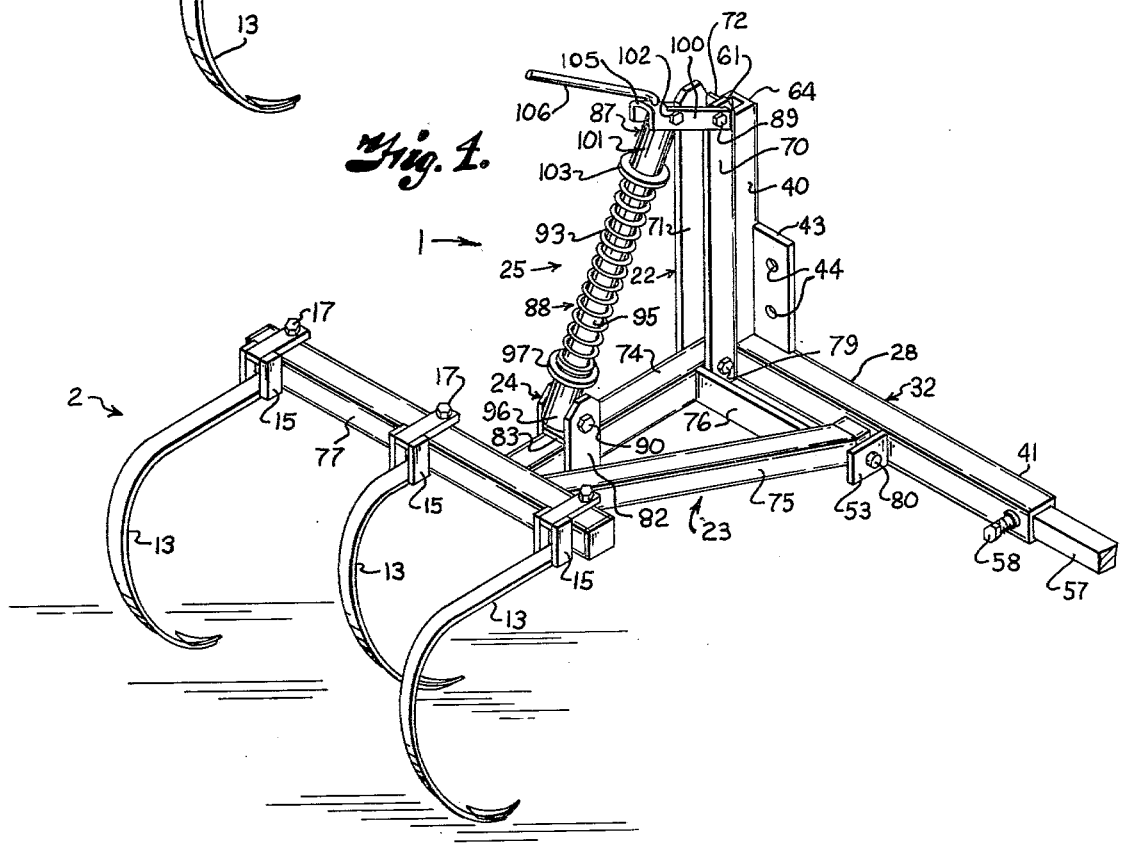

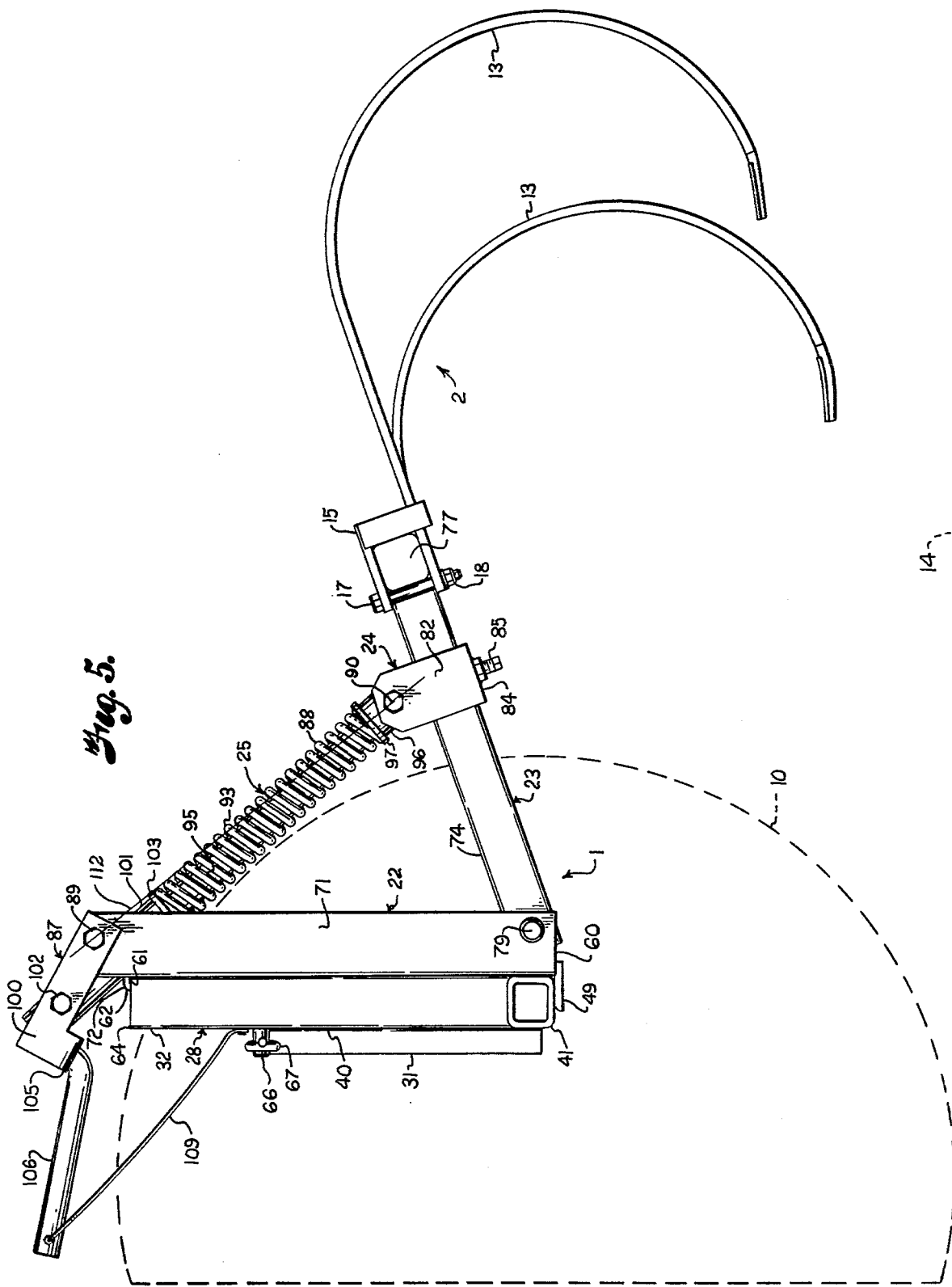

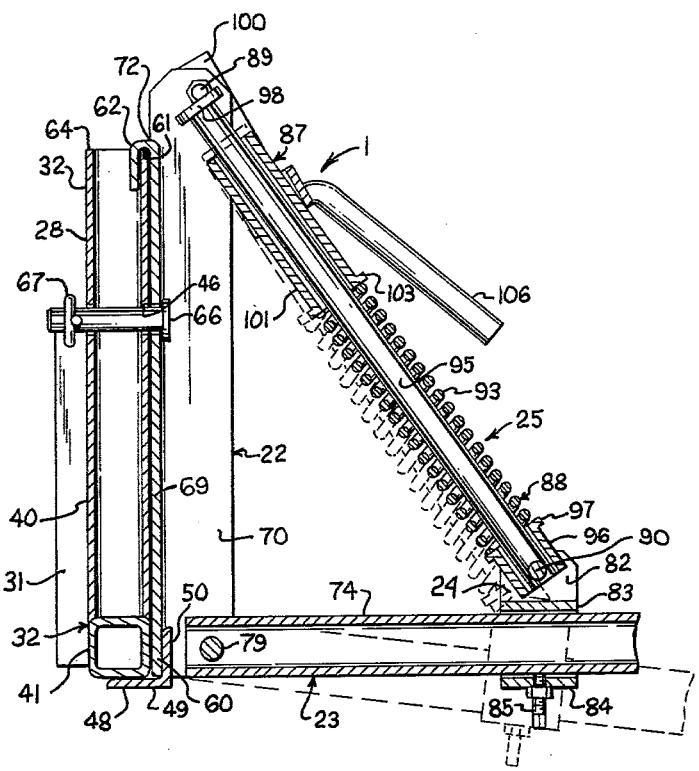
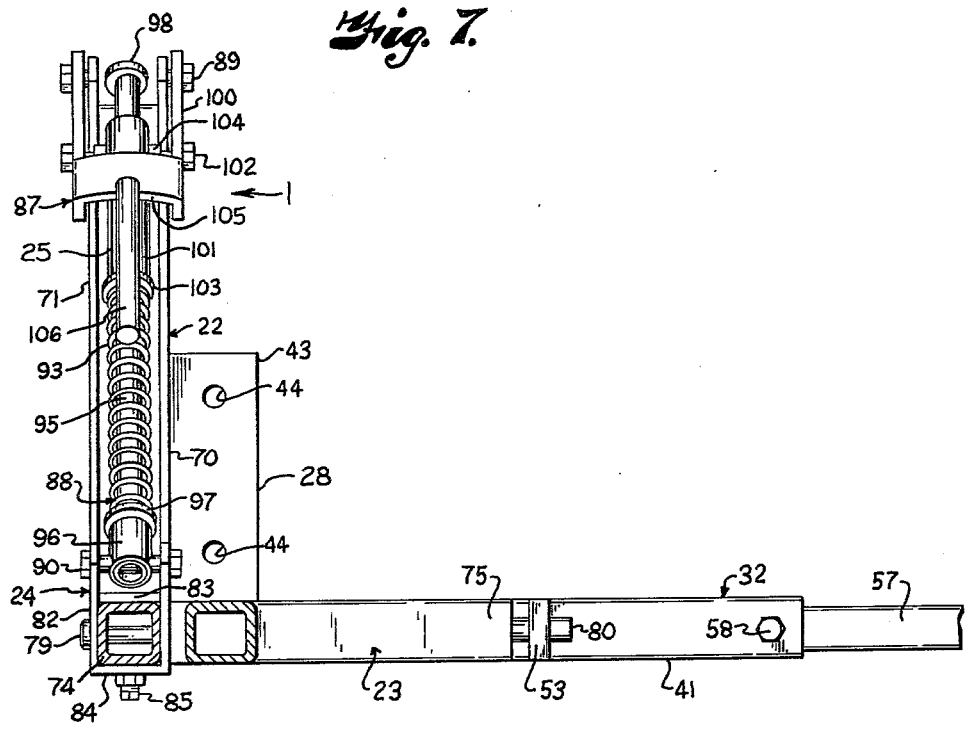

BIASED AGRICULTURAL IMPLEMENT

BACKGROUND OF THE INVENTION

This invention relates to an agriculture implement and more particularly to an agriculture implement for connecting soil engaging tools to mobile agricultural equipment.

Modern farmers, in order to economize on various agricultural operations, are today doing several of these operations in a single pass across a field by trailing compound or multiple devices behind a single tractor. For instance, tillage and fertilizing operations may be accomplished simultaneously in this manner. In order to further economize, many farmers are trailing large fertilizer nurse tanks behind a fertilizer injector rather than individually filling carried, spaced fertilizer tanks. This trailing nurse tank is usually heavy and tends to produce wide deep tracks in the just worked field, leaving the ground hard-packed and vulnerable to water erosion and weed growth. Thus, it is important to provide a device to remove these tracks. Because a number of different nurse tanks may be used during a single day, such a track removal device should be easily transferred from one nurse tank to another. In this regard see my copending application Ser. No. 897,114, filed Apr. 17, 1978, entitled QUICK MOUNTING MECHANISM FOR AGRICULTURAL IMPLEMENT. It is also important that such a track removal device be easily adjustable, as field conditions call for various tool depth and tool spacing settings, and such adjustability should not interfere with transferability. In this regard, the track removal device ideally should be independently mounted behind each individual tire in order to better follow the contour of the ground and render the device light enough for easy handling. Still, further, the tools of such a track removal device should not be fixed in position in vertical adjusted relationship to the ground, as rocks and other obstructions are frequently encountered which would otherwise cause breakage and/or put excessive strain upon the equipment behind which the device is trailing. Although it is necessary not to have the track removal device fixed in relationship to the ground, yet it should be biased theretoward, to reassume, after striking an obstruction, a selected depth in the soil being worked. Still further, it is desirable that the device be easily disengaged and locked out of operational position without detaching the entire structure at such times when it is not desired to work the soil, for example, when driving down a road or transferring between separated fields.

OBJECTS OF THE INVENTION

Therefore, the principal objects of the present invention are: to provide an agriculture implement for connecting soil working tools to mobile agriculture equipment; to provide such an implement which allows independent mounting of soil working tools or gangs of soil working tools behind mobile agricultural equipment, which soil engaging tools unpack ground behind wheels of mobile agricultural equipment; to provide such an implement which allows easy and quick detachment of the soil working tools from one vehicle and reattachment to another; to provide such an implement which allows selected depth adjustment of the soil working tools and fine adjustment thereof; to provide such an implement which biases the soil working tools into the ground but allows flexibility of such tools when striking an obstruction therein; to provide such an implement which allows the soil engaging tools to be locked in a soil engaged position; to provide such an implement which allows the soil engaging tools to be locked in a soil disengaged position; to provide such an implement which has a combination of adjusting and linkage elements which are simple yet cooperate effectively to produce the above mentioned effects; to produce such an implement which may be used in combination with agricultural equipment, soil working tools, and a quick mounting mechanism; and to provide such an implement which is capable of an extended useful life and is particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a mobile tank vehicle having soil working tools trailing therebehind and connected thereto by an implement embodying the present invention.

FIG. 2 is an enlarged side elevational view of the implement having soil working tools attached thereto and a quick mounting mechanism with portions thereof broken away and showing depth adjustment of the soil working tools in phantom.

FIG. 3 is a partially exploded perspective view of the implement having soil working tools attached thereto, and the mounting mechanism showing connection thereof to a frame of a mobile agricultural device.

FIG. 4 is a perspective view of the implement, mounting mechanism and soil working tools shown in FIG. 3, with the soil working tools in a partially raised position.

FIG. 5 is a side elevational view of the implement, and soil working tools attached thereto locked in a soil disengaged position and the mounting mechanism, also showing the wheel of a mobile agricultural device in phantom.

FIG. 6 is a side elevational view of the implement and mounting mechanism with portions thereof broken away, shown locked in a tool mounted position and in soil engaging position and also showing, in phantom, the pivotal and biasing movement of a trailing arm and extensile arm of the implement.

FIG. 7 is a fragmentary rear elevational view of the implement locked in soil engaging position and the mounting mechanism.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the illustrated embodiment of the present invention shown in the drawings, the reference numeral 1 generally designates a agriculture implement, according to the present invention, for connecting soil engaging tools 2 to mobile agricultural equipment 3.

For purposes of description as used herein the term "front" means toward the left as seen in FIG. 2.

The mobile agricultural equipment 3 particularly contemplates devices which leave deep indentations or tracks in freshly worked soil. The agricultural equipment 3 in the illustrated embodiment, as is best shown in FIG. 1, comprises a fertilizer tank 7 supported on a front wheeled frame 8 and a rear wheeled frame structure 9 associated respectively with supporting wheels 10 rotatably attached thereto.

The soil engaging or working tool 2 may be any suitable device for working the soil, particularly including but not limited to a device having spring teeth and also contemplates gangs of tools. In the illustrated embodiment as seen in FIG. 2, the soil working tool 2 had a plurality of spaced apart spring teeth 13 which engage the soil 14 and have clamps 15 attached thereto for securing to the implement 1. The clamps 15 are secured in desired transverse position on the implement 1 by bolts 17 having fasteners such as nuts 18.

The implement 1, as best illustrated in FIG. 3, comprises a frame structure 22, a trailing arm structure 23, and an extensile arm structure 25 having a lower terminal sleeve member 24. A quick mounting mechanism 28 connects the implement 1 with the agricultural equipment 3.

The mounting mechanism 28, as best illustrated in FIG. 3, comprises a securing device 31 and an L-shaped frame 32, fastened together by bolts 33 and nuts 34. The securing device 31 comprises a plate-like device 37 having a slot 38 therein, which slot 38 has a substantially vertical attitude. The plate 37 is secured by welding or other suitable means to the rear frame 9. The slot 38 opens inwardly into a basically T-shaped channel, as seen in FIG. 2, such that the bolts 33 are placed therein and extend therefrom, having their heads 35 slidably held by the coextensive interior T-shape of the slot 38, but leaving the threaded end of the bolt 33 to extend outwardly therefrom. The bolt heads 35 are fastened to a joining member 36 which maintains a predetermined spacing therebetween and prevents rotation of the bolts 33 in the slot 38. The bolts 33 are in this manner free to move in various vertical positions along the device 37. The L-shaped frame 32, as is best seen in FIG. 3, is comprised of an upwardly extending arm 40 and a horizontal arm 41 fixedly attached to one another near a lower end of the upward arm 40. A vertically oriented plate 43 is fixedly attached to the arms 40 and 41 at the interior junction thereof, the plate 43 having therein two vertically aligned openings 44 of a diameter and spacing suitable to receive the threaded portions of the bolts 33. The bolts 33 and the fasteners 34 secure the plate 43 to the device 37.

Located medially through the upward arm 40 is a horizontally positioned opening 46 which is generally front to rearwardly aligned. The upper arm 40 is rectangular and tubular in nature and open at the top thereof. Located relatively near and below the junction of the upward arm 40 and the horizontal arm 41 and attached thereon is a tabular projection or hook 48 having a base portion 49 fixedly attached to the lower end of the L-shaped frame 32 and extending rearwardly of the horizontal arm 41, and a triangular portion 50 extending upwardly from the rearward end of the base portion 49, thereby being aligned in a generally vertical plane parallel to the plane of the L-shaped frame 32.

Located at a medial distance along the horizontal arm 41 and extending rearwardly thereof is a tab 53 having an opening or socket therein 54. The horizontal arm 41 is tubular in structure and may be connected to similar arms or other mounting apparatus, as shown in FIG. 1, by a connecting rod 57 which is slidably insertable therein and secured by a set screw 58.

The frame structure 22 may comprise any device or combination of devices which extends in a substantially vertical orientation, is suitable for connection with the securing device 31, is pivotal at an upper end thereof with the extensile arm structure 25, and is pivotal at a lower end thereof with the trailing arm structure 23. As shown in the illustrated embodiment, the frame structure 22 is a U-shaped beam disposed longitudinally in a generally vertical orientation, such that the U-shaped portion opens in a rearward direction. As is best seen in FIGS. 2 and 6, the lower terminal end 60 of the frame structure 22 is adapted for receiving the hook 48 therein. Near the upper terminal end 61 of the frame structure 22 is attached a second tubular projection or hook 62 of somewhat similar design to the hook 48 on the L-shaped 32. The second hook 62 is adapted for being received into the upper terminal end 64 of the upward arm 40. Also an opening 65 is located medially along the frame structure 22 and opens in a generally front to rear orientation. The dimensions of the frame structure 22 and the upward arm 40 are such that the distance between opening 65 and the second hook 62 is equal to the distance between the opening 46 and the upper terminal end 64 of the upward arm 40. Also the distance between the opening 65 and the lower terminal end 60 of the frame structure 22 is equal to the distance between the opening 46 and the hook 49 on the upward arm 40. Thus, when the frame structure 22 and the upward arm 40 are aligned such that the hooks 48 and 62 are positioned in the terminal ends 60 and 64 respectively, the opening 65 aligns with the opening 46 whereby a pin 66 can be inserted therethrough and secured by fastener 67, as is shown in FIGS. 2 and 6.

The frame structure 22 has two side panels 70 and 71 and a somewhat shorter front panel 69 which are joined together along the edges thereof. The top terminal end of the front panel defines a stop 72 which will be discussed in greater detail hereinafter. Located at opposite terminal ends of each of the side panels 70 and 71 are openings (not shown) for receiving a pivotal member 79 which will also be discussed in greater detail hereinafter.

The trailing arm structure 23 may be comprised of any device or grouping of devices which is suitable for pivoting on the frame structure 22, supporting the tool 2, and slidably engaging the sleeve member 24. In the illustrated embodiment, the trailing arm structure 23 comprises a rearwardly extending member 74, a diagonally extending bracing member 75, a transversely extending bracing member 76 between the rearward member 74 and the bracing member 75, and a tool bar member 77 attached at the rearward ends of members 74 and 75 and broadly being horizontally and transversely oriented. The members 74, 75, and 76 form a generally triangular shape, thereby providing a geometrically stable base support for the tool bar member 77. Near the front terminal end of the rearward member 74 is an opening (not shown) through which a pin 79 pivotally attaches the member 74 to the frame structure 22, such that the trailing arm structure radially pivots about a horizontal transverse axis coaxially aligned with the pin 79. The diagonally extending member 75 has a pin 80, also coaxially aligned with the pin 79, attached near the frontward end thereof, the pin 80 being adapted for being received in the socket 54 thereby pivotally connecting the trailing arm structure 23 to the connecting mechanism 28 at a plurality of points along a substantially horizontal axis. The spring teeth 13 of the tool 2 are secured by clamps 15 to and depend downwardly and rearwardly of the tool bar member 77 at selected distances therealong.

The sleeve member 24 comprises a generally U-shaped device suitable for slidably engaging the length of the rearward member 74. Parallel sides 82 of the sleeve member 24 extend in a generally vertical orientation and have openings (not shown) near the upper terminal end thereof for pivotally mounting the extensile arm structure 25 thereon, as will be discussed further hereinafter. A bar member 83 extends between and connects the sleeve member sides 82 over the top of the rearward member 74. The sleeve member 24 has a bottom side 84 having an opening (not shown) therein for receiving a set screw 85 having an in or locking position and an out position. The set screw 85 is adapted for biasing against the rearward member 74 thereby locking the sleeve member 24 in a selected position thereupon when the set screw 85 is in the locking position.

The extensile arm structure 25 may comprise any device or group of devices suitable for raising and lowering the tool 2, for locking the tool 2 in a disengaged position, for locking the tool 2 in a soil engaged position, and for nonrigidly biasing the tool 2 into the soil 14 to a previously selected depth. In the illustrated embodiment, the extensile arm structure 25 comprises an upper portion 87 pivotally attached near an upper terminal end thereof by a pair of pins 89 to an upper end of the frame structure 22, a lower portion 88 pivotally attached at a bottom terminal end thereof by a pin 90 to the sleeve member 24, and biasing means comprising a compression spring 93.

The extensile arm lower portion 88 comprises an elongate cylindrical member or rod 95 having a tubular sleeve 96 with a radial lip 97 extending therefrom and attached to a lower end thereof, as is shown in FIG. 6. The cylindrical member 95 also has a radially extending stop or second lip 98 attached to an upper end thereof.

The extensile arm structure upper portion 87 has an upper section 100 and a lower section 101. The lower section or slide means 101 comprises a tubular sleeve which slidably engages the cylindrical member 95 and abuts against the lip 98 at an upper terminal end thereof. The lower section 101 also has a radially extending lip 103 at a lower end thereof. As is best seen in FIG. 7, a pair of hinge pins 102 are received in a pair of holders 104 respectively attached near an upper end of the lower section 101. The upper portion upper section or lever 100 comprises a device shaped to pivot about the hinge pins 102 and yet allow free movement of the cylinder member 95 therethrough and includes a bridge or crown area which forms a stop 105 which will be discussed further hereinafter.

Extending outwardly from near the lower terminal end of the upper portion upper section 100 is a handle 106. The spring 93 is an elongate compression spring and is sleeved on a medial elongate segment of the cylindrical member 95. The spring 93 thrusts against the lip 97 on the lower portion 88 and against the lip 103 on the upper portion 87. The locations of the extensile arm upper section 100, lower section 101, hinge pins 102, pivot pins 89 and spring produce on over-center locking mechanism, such that a state position is obtained in opposed positions of maximum rotation of the upper section 100 about the pivot pins 89. More specifically, with regard to soil engaging position, shown in FIG. 2, a line 112 exists between the centers of the pivot points 89 and 90. This line 112 represents the dividing line for rotation of the upper section 87 about the pins 89. Thus, if the hinge pins 102 are revolved about the pivot pins 89 in a clockwise direction (as viewed in FIG. 2) past the line 112, the spring 93 will become operative to urge the section 87 in the clockwise direction about the pins 89, until such time as the stop or first locking means 105 is encountered whereat the extensile arm 25 will thus bend no further and a stable position is achieved. In this manner the teeth 13 are locked in a soil engaged position. Alternatively, a second stable position may be obtained with the teeth 13 in a soil disengaged position, as shown in FIG. 5. To achieve this position, the hinge pins 102 are revolved about the pivot pins 89 in a counterclockwise direction (as viewed in FIG. 5) past the line 112. However, in this case it is not the thrust of the spring which provides the driving force away from the line 112, but rather the vector force of the weight of teeth 13, the trailing arm structure 23, and the other members which pull downwardly on the extensile arm structure 25. The extensile arm lower portion 88 will continue to rotate counterclockwise, as seen in FIG. 5, until stop 72 or second locking means is engaged by the lower section 101 at which time the second stable position is achieved, and the tool 2 is thus locked in a soil disengaged position.

An easily removable safety strap 109, as seen in FIG. 5, is optionally attached to the upward arm 40 for securing the handle 106 in spring teeth ground disengaged position.

The trailing arm rearward member 74 and the frame structure 22 constitute legs of a flexible triangle of which the extensile arm structure 25 is the hypotenuse thereof. The plane of the triangle is vertically orientated and generally perpendicular to the plane of the triangularly positioned members 74, 75 and 76 of the trailing arm structure 23, the two planes being joined at the rearward member 74 therebetween. Thereby a solid horizontal and vertical base of triangular geometric shape is provided for the tool 2.

In use, the securing device 31 is suitably attached to the frame 9 of the mobile agricultural equipment 3. The connecting mechanism L-shaped frame 32 receives the bolts 33 of the securing device 31 through the openings 44 therein and is adjusted to the desired height by sliding the bolts 33 in the channel 38. The L-shaped frame 32 is then fixedly positioned by tightening the fasteners 34. The implement 1 is then received by the connecting mechanism 28 in one cooperative engaging movement. That is, the pin 80 is received in the socket 54 and the hooks 48 and 62 are received in the frame structure terminal end 60 and the upper arm terminal end 64 respectively in one simple and simultaneous movement. The pin 66 is then inserted through the openings 65 and 46 and secured therein by fastener 67, thereby locking the connecting mechanism 28 to the implement 1. The teeth 13 have been previously attached to the tool bar member 77 and are adjustable to different widths and tool densities therealong.

Besides the gross height adjustment accomplished by positioning the L-shaped frame 32 relative to the securing device 31 as discussed above, the implement 1 serves at least five important functions which include fine adjustment of the depth to which the teeth 13 engages the soil 14, engaging and disengaging the teeth 13 from the soil 14, non-rigidly biasing the teeth 13 into the soil 14, locking the teeth 13 in a soil engaged position, and locking the teeth 13 in a soil disengaged position. The fine adjustment of the depth of the teeth 13 in the soil 14 is accomplished by loosening the set screw 85 and sliding the sleeve member 24 along the rearward member 74 thereby radially pivoting the trailing arm structure 23, and in particular the tool bar 77, on the pins 79 and 80 either counterclockwise or clockwise as seen in FIG. 2, depending on whether the sleeve member 24 is moved rearwardly or frontwardly respectively, thus raising or lowering the teeth 13 respectively. To lock the depth position of the teeth 13, the set screw 85 is again tightened against the rearward member 74. The engaging and disengaging of the teeth 13 with the soil 14 is accomplished by rotating the handle 106 about the hinge pins 102. By rotating the handle 106 counterclockwise, as seen in FIG. 5, the extensile arm upper portion upper section 100 and lower section 101 are folded upon themselves so as to be oriented in a side-by-side relationship originating at the hinge pins 102. The side-by-side relationship of the upper section 100 and lower section 101 shortens the length of the extensile arm structure 25, upwardly pivoting the trailing arm structure 23 upon the pins 79 and 80 at the frontward end thereof, thereby disengaging the teeth 13 from the soil 14. To engage the teeth 13 in the soil 14, the opposite procedure is followed. To lock the teeth 13 in the soil disengaged position, the handle 106 is rotated as far counterclockwise as possible, as shown in FIG. 5, until the stop 72 is engaged. The teeth 13 are locked in the soil disengaged position because of the over-center nature of the extensile arm structure 25 as was discussed hereinbefore. Likewise the handle 106 is rotated as far clockwise as possible until the stop 105 is engaged, as shown in FIG. 2, again the locking effect is due to the over-center nature of the extensile arm structure 25. The non-rigid biasing of the teeth 13 into the soil 14 is also accomplished by the extensile arm structure 25. The lip 98 at the top of the extensile arm cylindrical member 95 limits the maximum length of the extensile arm structure 25 when in the soil engaging position, and thus positions the teeth 13 at a selected depth in the soil 14. The compression spring 93 thrust against the lips 97 and 103 thereby biasing the extensile arm upper portion 87 and lower portion 88 in opposite directions until the lip 98 is engaged by the upper portion lower section 101. Thus, the teeth 13 are continually biased to a selected given depth in the soil 14. However, if the teeth 13 should hit a rock or other obstruction in the soil 14, they may non-rigidly rise to pass over such an obstruction and thereafter be returned to their original depth in the soil 14 by the biasing action of the spring 93. In addition to these above mentioned functions, the implement 1, of course, mounts the teeth upon the mobile agricultural equipment 3 in conjunction with the mounting mechanism 28 and also has the unique feature of being able to independently mount various tools 2 at different locations upon or in different groupings upon the mobile agricultural equipment 3.

While use of the implement 1 has been illustrated and described as mounting tools and in particular spring teeth 13 for removal of tracks behind mobile agricultural equipment 3, the invention is not meant to be limited thereto. For instance, it can also be seen that the invention could be used to independently mount spring tooth cultivators, especially in areas where the cultivator would frequently come out of ground engagement, for instance, when crossing over a terrace.

It is to be understood that while I have illustrated and described certain embodiments of my invention, it is not to be limited to the specific forms or arrangements of parts herein described and shown.

Having thus described the invention, what is claimed and desired to secure by Letters Patent is:

1. An implement for mounting a soil engaging tool on mobile agriculture equipment comprising:
   (a) an upper and a lower pivoting means adapted for connection to said agricultural equipment;
   (b) a trailing arm pivotally attached to said lower pivoting means and having a free end, said soil engaging tool being attached to said free end;
   (c) a sloping extensile arm having an upper portion attached to said upper pivoting means and a lower portion;
   (d) a sleeve member slidable along said trailing arm and pivotally attached to said extensile arm lower portion;
   (e) fastening means adjustably securing said sleeve member in a desired position along said trailing arm, whereby said soil engaging tool is adjustable to a selected depth in the soil;
   (f) stop means restricting the maximum length of said extensile arm;
   (g) biasing means engaging and biasing said extensile arm upper and lower portions apart whereby said trailing arm and said soil engaging tool attached thereto are biased in a generally downward direction until said stop means is engaged;
   (h) said extensile arm upper portion including an upper section and a lower section pivotally connected therebetween;
   (i) first locking means whereby said upper and lower sections can be locked in an elongate position thereby lowering said soil engaging tool and engaging same with said soil by lengthening said extensile arm upper portion; and
   (j) second locking means whereby said upper and lower sections can be locked in side by side position thereby raising and disengaging said soil engaging tool from said soil by shortening said extensile arm upper portion; and wherein:
   (k) said first and second locking means in combination with said hinged upper and lower sections comprise an over center locking mechanism.

2. An implement for mounting a soil engaging tool on mobile agriculture equipment comprising:
   (a) a frame adapted for connection to said agricultural equipment and including an upper and a lower pivoting means;
   (b) a trailing arm pivotally attached to said lower pivoting means and having a free end, said soil engaging tool being attached to said free end;
   (c) a sloping extensile arm having an upper portion attached to said upper pivoting means and a lower portion;

(d) a sleeve member slidable along said trailing arm and pivotally attached to said extensile arm lower portion;
(e) fastening means adjustably securing said sleeve member in a desired position along said trailing arm, whereby said soil engaging tool is adjustable to a selected depth in the soil; and wherein
(f) said trailing arm comprises two side members and a diagonal member triangularly arranged in a generally horizontal attitude, whereby said trailing arm is imparted with geometric strength thereby;
(g) said trailing arm being pivotally attached to said frame at a plurality of points along a generally horizontal transverse axis therebetween, whereby said trailing arm radially pivots about said horizontal axis, and whereby said trailing arm does not substantially move in a horizontal plane in relation to said frame; and
(h) said frame and one of said trailing arm side members being legs of a triangle and said extensile arm being the hypotenuse of said triangle, said triangle having a generally vertical attitude with said trailing arm extending substantially perpendicularly from a lower end thereof, whereby geometric strength is imparted to said apparatus in both vertical and horizontal directions.

3. In combination:
(a) mobile agriculture equipment producing indentations in soil being traversed thereby;
(b) a soil working tool attached to and trailing behind said mobile agriculture equipment and removing said indentations, said tool having a mounted position and an unmounted position;
(c) an implement connecting said soil working tool with said mobile agriculture equipment when said soil working tool is in said mounted position;
(d) a quick connect mechanism for attaching said implement to said mobile agriculture equipment when said soil working tool is in said mounted position, whereby said soil working tool can be quickly connected with and disconnected from said mobile agriculture equipment;
(e) said implement comprising:
  (1) a vertically extending frame attached to said quick connect mechanism, said frame having an upper part and a lower part;
  (2) a trailing arm pivotally attached to said frame lower part, said soil working tool being attached to a free end of said trailing arm; and
  (3) an extensile arm comprising:
    (a) an upper portion pivotally attached at an upper end thereof to said frame upper part;
    (b) a sleeve member; and
    (c) a lower portion having a lower end thereof pivotally attached to said sleeve member, said sleeve member being slidable along the length of said trailing arm and having a fastening means for selectively and positively positioning said sleeve member along said trailing arm, whereby said soil working tool is positioned at a selected depth in the soil by the positioning of said sleeve member along said trailing arm;
(f) said extensile arm lower portion slidably engaging said extensile arm upper portion;
(g) stop means restricting the maximum length of said extensile arm;
(h) biasing means engaging and biasing said extensile arm upper and lower portions in opposite directions, whereby said trailing arm and said soil working tool attached thereto are biased in a generally downward direction until said stop means is engaged and whereby said soil working tool flexibly engages the soil, thereby allowing same to raise upon striking an obstruction in said soil, said tool being biased to return to said selected depth after passing over said obstruction;
(i) said extensile arm upper portion including an upper section pivotally connected to a lower section;
(j) first locking means whereby said upper and lower sections can be locked in an elongate position thereby lowering said soil working tool and engaging same with said soil by lengthening said extensile arm upper portion; and
(k) second locking means whereby said upper and lower sections can be locked in side by side position thereby raising and disengaging said soil working tool from said soil by shortening said extensile arm upper portion.

4. The combination according to claim 3 wherein:
(a) said first and second locking means in combination with said hinged upper and lower sections comprise an over center locking mechanism.

5. The combination according to claim 3 wherein:
(a) said extensile arm lower portion comprises an elongate cylindrical member having said sleeve member pivotally attached at a lower end thereof;
(b) said extensile arm upper portion lower section comprises a tubular sleeve, said tubular sleeve slidably engaging an upper elongate segment of said cylindrical member;
(c) said stop means comprises a radially extending lip on an upper end of said cylindrical member of larger diameter than the interior diameter of said tubular sleeve whereby said tubular sleeve is maintained in sliding engagement with said cylindrical member; and
(d) said biasing means comprises a compression spring, a lower end of said spring thrusting against said cylindrical member and an upper end of said spring thrusting against said tubular sleeve.

6. In combination:
(a) mobile agriculture equipment producing indentations in soil being traversed thereby;
(b) a soil working tool attached to and trailing behind said mobile agriculture equipment and removing said indentations, said tool having a mounted position and an unmounted position;
(c) an implement connecting said soil working tool with said mobile agriculture equipment when said soil working tool is in said mounted position;
(d) a quick connect mechanism for attaching said implement to said mobile agriculture equipment when said soil working tool is in said mounted position, whereby said soil working tool can be quickly connected with and disconnected from said mobile agriculture equipment;
(e) said implement comprising:
  (1) a vertically extending frame attached to said quick connect mechanism, said frame having an upper part and a lower part;
  (2) a trailing arm pivotally attached to said frame lower part, said soil working tool being attached to a free end of said trailing arm;
  (3) an extensile arm comprising:

(a) an upper portion pivotally attached at an upper end thereof to said frame upper part;
(b) a sleeve member; and
(c) a lower portion having a lower end thereof pivotally attached to said sleeve member, said sleeve member being slidable along the length of said trailing arm and having a fastening means for selectively and positively positioning said sleeve member along said trailing arm, whereby said soil working tool is positioned at a selected depth in the soil by the positioning of said sleeve member along said trailing arm;

(f) said trailing arm including two side members and a diagonal member triangularly arranged in a generally horizontal attitude, whereby said trailing arm is imparted with geometric strength thereby;

(g) said trailing arm being pivotally attached to said frame at a plurality of points along a generally horizontal transverse axis therebetween, whereby said trailing arm radially pivots about said horizontal axis and whereby said trailing arm does not substantially move in a horizontal plane in relation to said frame; and (h) said frame and one of said trailing arm side members being legs of a triangle and said extensile arm being the hypotenuse of said triangle, said triangle having a generally vertical attitude with said trailing arm extending substantially perpendicularly from a lower end thereof, whereby geometric strength is imparted to said apparatus in both vertical and horizontal directions.

7. In an implement for mounting a soil engaging tool on mobile agricultural equipment, said implement including: a vertical arm connected to said agricultural equipment; a trailing arm pivotally connected to a lower end of said vertical arm for pivoting about a transverse horizontal axis and having said tool attached to a free end thereof; an extensile arm having a lower end pivotally connected to said trailing arm; and adjustable means adjustably connecting an upper end of said extensile arm to an upper end of said vertical arm and being operable to selectively position said trailing arm for soil engagement of said tool or for disengagement thereof, the improvement comprising:

(a) said adjustable means being an over center locking mechanism operable to releasably lock said trailing arm in an engaged position for engagement of said tool with the soil and, alternatively, in a disengaged position with said tool out of engagement with said soil;

(b) said extensile arm including slide means slideable thereon and biased toward the upper end thereof and stop means to limit the sliding of said slide means toward said upper end of said extensile arm;

(c) said adjustable means including a lever pivotally connected to said upper end of said vertical arm by means of a first pivot and pivotally connected to said slide means by means of a second pivot, said lever being operable to revolve said second pivot about said first pivot;

(d) the pivotal connection of said extensile arm to said trailing arm constituting a third pivot, and a reference line being defined through said first and third pivots;

(e) said lever including a first locking means located for engagement by said extensile arm thereby achieving an over center locked condition with said trailing arm in said engaged position upon the revolution of said second pivot about said first pivot past said reference line in a first angular direction; and (f) said vertical arm including a second locking means engageable by said extensile arm thereby achieving an over center locked condition with said trailing arm in said disengaged position upon the revolution of said second pivot about said first pivot past said reference line in a second angular direction, opposite from said first angular direction.

8. The implement according to claim 7 wherein said extensile arm includes:

(a) an elongated rod pivotally connected to said trailing arm;
(b) first lip means on a lower end of said rod;
(c) a compression spring received on said rod and engaging said first lip means;
(d) said slide means comprising a sleeve slidably received on said rod;
(e) said sleeve including second lip means for engagement by said spring;
(f) said stop means being on an upper end of said rod for engagement by said sleeve, said spring biasing said sleeve toward said stop means; and
(g) said lever being pivotally connected by said second pivot to said sleeve.

* * * * *